US007962277B2

(12) United States Patent
Hofmeister et al.

(10) Patent No.: US 7,962,277 B2
(45) Date of Patent: Jun. 14, 2011

(54) METHOD AND DEVICE FOR OPERATING AN INTERNAL COMBUSTION ENGINE

(75) Inventors: Carl-Eike Hofmeister, Regensburg (DE); Michael Käsbauer, Neutraubling (DE)

(73) Assignee: Continental Automotive GmbH, Hannover (DE)

( * ) Notice: Subject to any disclaimer, the term of this patent is extended or adjusted under 35 U.S.C. 154(b) by 224 days.

(21) Appl. No.: 12/293,503

(22) PCT Filed: Mar. 19, 2007

(86) PCT No.: PCT/EP2007/052575
§ 371 (c)(1),
(2), (4) Date: Sep. 18, 2008

(87) PCT Pub. No.: WO2007/107540
PCT Pub. Date: Sep. 27, 2007

(65) Prior Publication Data

US 2009/0326787 A1 Dec. 31, 2009

(30) Foreign Application Priority Data

Mar. 20, 2006 (DE) ........................ 10 2006 012 656

(51) Int. Cl.
*G06F 19/00* (2011.01)

(52) U.S. Cl. ........................................ 701/110; 701/104

(58) Field of Classification Search .................. 701/104, 701/110, 114, 115; 123/436, 673, 687, 352, 123/492, 493
See application file for complete search history.

(56) References Cited

U.S. PATENT DOCUMENTS

| | | | | |
|---|---|---|---|---|
| 4,112,879 | A | 9/1978 | Assenheimer et al. | 123/32 EA |
| 4,569,319 | A * | 2/1986 | Thoma | 123/339.14 |
| 5,117,793 | A | 6/1992 | Taue et al. | 123/436 |
| 5,906,187 | A * | 5/1999 | Heuer | 123/436 |
| 5,974,788 | A | 11/1999 | Hepburn et al. | 60/274 |
| 6,044,826 | A | 4/2000 | Bayerle et al. | 123/568.16 |

(Continued)

FOREIGN PATENT DOCUMENTS

DE 3839611 5/1990

(Continued)

OTHER PUBLICATIONS

International Search Report and Written Opinion; PCT/EP2007/052575; pp. 17, Nov. 19, 2007.

*Primary Examiner* — John T Kwon
(74) *Attorney, Agent, or Firm* — King & Spalding L.L.P.

(57) ABSTRACT

During the operation of an internal combustion engine, a check is made whether the engine functions in an error-free manner in relation to the engine noise. If not, a current value of a cylinder-specific fuel quantity in a cylinder is determined. A check is made whether a current injected cylinder-specific fuel quantity in one of the cylinders is too low or high to check with respect to a cylinder-specific motor speed N_CYL, by comparing a current value of the cylinder-specific injection quantity in the relevant cylinder with a stored reference value of the cylinder-specific injection quantity of the relevant cylinder at the current operating point. A check with respect to the cylinder-specific motor speeds of one of the cylinders is deactivated, if the current injected cylinder-specific fuel quantity in the relevant cylinder is too low or high to check the relevant cylinder with respect to the cylinder-specific motor speed N_CYL.

6 Claims, 3 Drawing Sheets

U.S. PATENT DOCUMENTS

| | | | | |
|---|---|---|---|---|
| 6,199,373 | B1 | 3/2001 | Hepburn et al. | 60/274 |
| 6,244,046 | B1 | 6/2001 | Yamashita | 60/285 |
| 6,276,349 | B1 | 8/2001 | Kofler et al. | 123/673 |
| 6,619,262 | B2 * | 9/2003 | Graf et al. | 123/435 |
| 6,644,284 | B2 * | 11/2003 | Pfitz | 123/479 |
| 6,820,474 | B2 * | 11/2004 | Rueger et al. | 73/114.51 |
| 7,219,003 | B2 * | 5/2007 | Hagel et al. | 701/104 |
| 7,331,214 | B2 | 2/2008 | Aliakbarzadeh et al. | 73/23.32 |
| 7,360,523 | B2 | 4/2008 | Sloane et al. | 123/305 |
| 7,392,789 | B2 | 7/2008 | Dietl et al. | 123/436 |
| 2002/0148441 | A1 | 10/2002 | Tuken | 123/436 |
| 2007/0113546 | A1 | 5/2007 | Jankovic | 60/287 |

FOREIGN PATENT DOCUMENTS

| | | |
|---|---|---|
| DE | 4104742 | 9/1991 |
| DE | 19812305 | 9/1999 |
| DE | 19846393 | 4/2000 |
| DE | 10034144 | 7/2000 |
| DE | 10240476 | 9/2002 |
| DE | 102004006554 | 2/2004 |
| DE | 102004030757 | 6/2004 |
| DE | 102004044808 | 6/2004 |
| DE | 69821171 | 11/2004 |
| DE | 102004004291 | 1/2005 |
| DE | 69933091 | 3/2007 |
| EP | 0795686 | 3/1997 |

* cited by examiner

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2007/052575 filed Mar. 19, 2007, which designates the United States of America, and claims priority to German Application No. 10 2006 012 656.4 filed Mar. 20, 2006, the contents of which are hereby incorporated by reference in their entirety.

TECHNICAL FIELD

The invention relates to a method and a device for operating an internal combustion engine. The internal combustion engine comprises at least two cylinders, one induction tract and one exhaust-gas tract. The induction tract and the exhaust-gas tract communicate with a combustion chamber of one of the cylinders depending on a switched position of a gas inlet valve or of a gas exhaust valve. Furthermore, for each cylinder, the internal combustion engine comprises at least one injection valve and a piston, with the piston being connected to a crankshaft of the internal combustion engine.

BACKGROUND

From EP 0 795 686 B1, a device is known for detecting misfiring of an electronically controlled diesel engine. The diesel engine includes a crankshaft, a combustion chamber, an injection nozzle for injecting fuel into the combustion chamber and an injection pump. The injection pump is driven by the crankshaft and used to pressurize the fuel and supply the fuel to a nozzle. The diesel engine ignites the fuel to rotate and drive the crankshaft. The unit includes a device for detecting the rotational speed of the crankshaft and a device for controlling the injection pump in order to set the quantity of fuel to be injected by the injection nozzle into the combustion chamber. The control device controls the injection pump so that the quantity of fuel to be supplied by the injection pump to the injection nozzle reduces in accordance with an increase in the rotary speed detected by the detection device. Furthermore, the unit has a first calculation device for calculating a rate of change of the rotational speeds at predetermined rotation-phase positions of the crankshaft on the basis of the rotational speed detected by the detection device. Furthermore, the unit includes a device for determining an occurrence of misfiring in the diesel engine on the basis of a comparison of the rate of change calculated by the first calculation device with a predetermined reference value. A second calculation unit for calculating a change in the quantity of fuel to be injected by the injection nozzle and a device for correcting the reference value used for determining the misfire on the basis of the change in the quantity of the fuel calculated by the second calculation device is provided.

SUMMARY

A method and a device can be provided that respectively enable a precise operation of an internal combustion engine in a simple manner.

According to an embodiment, a method for operating an internal combustion engine, which comprises as least two cylinders, an induction tract and an exhaust-gas tract, which communicate with a combustion chamber of one of the cylinders depending on a switched position of a gas inlet valve and/or of a gas exhaust valve, and which, for each of the cylinders, comprises at least one injection valve and a piston, with said piston being connected to a crankshaft of the internal combustion engine, may comprise the steps of:—a check is carried out to determine whether one or more necessary diagnostic conditions for a diagnosis of uneven running of the internal combustion engine are currently present,—a check is carried out to determine whether the internal combustion engine is functioning fault-free with respect to uneven running, if the one and/or more necessary diagnostic conditions are currently present,—if the internal combustion engine is functioning fault-free with respect to uneven running,—a current value of a cylinder-specific injection quantity is determined for each cylinder depending on a control input to the relevant injection valve,—the current value of the cylinder-specific injection quantity is assigned to a reference value of the cylinder-specific injection quantity at a current operating point of the internal combustion engine,—the reference value of the cylinder-specific injection quantity is stored.

According to a further embodiment, the current value of the cylinder-specific injection quantity can be low-pass filtered and the low-pass filtered value of the cylinder-specific injection quantity can be assigned to the reference value of the cylinder-specific injection value.

According to another embodiment, a method for operating an internal combustion engine, which comprises at least two cylinders, an induction tract and an exhaust-gas tract, which communicate with a combustion chamber of one of the cylinders depending on a switched position of a gas inlet valve and/or a gas exhaust valve, and which for each of the cylinders includes at least one injection valve and one piston, with said piston being connected to a crankshaft of the internal combustion engine, may comprise the steps of:—a check is carried out to determine whether one or more necessary diagnostic conditions for a diagnosis of uneven running of the internal combustion engine are currently present,—a check is carried out to determine whether the internal combustion engine is functioning fault-free with respect to uneven running, if one or more necessary diagnostic conditions are currently present,—if the internal combustion engine is not functioning fault-free with respect to uneven running,—a current value of a cylinder-specific fuel quantity of the cylinders is determined,—a check is carried out to determine whether a current injected cylinder-specific fuel quantity in one of the cylinders is too low or too high to check the relevant cylinder with respect to a cylinder-specific engine speed, by comparing the current value of the cylinder-specific injection quantity in the relevant cylinder with a stored reference value of the cylinder-specific injection quantity of the relevant cylinder at the current operating point of the internal combustion engine,—a check with respect to the cylinder-specific engine speeds of one of the cylinders deactivated if the current injected cylinder-specific fuel quantity in the relevant cylinder is too low or too high to check the relevant cylinder with respect to the cylinder-specific engine speed,—a check with respect to the cylinder-specific engine speeds of the cylinders is carried out to determine whether the relevant cylinder-specific engine speeds lie within a predetermined speed range,—a faulty operation of a cylinder is detected if the relevant cylinder-specific engine speed of the relevant cylinder lies outside the predetermined speed range.

According to a further embodiment, to compare the current value of the cylinder-specific injection quantity of the relevant cylinder with the stored reference value of the cylinder-specific injection quantity of the relevant cylinder at the current operating point of the internal combustion engine, a difference can be determined between the current value and the stored reference value of the cylinder-specific injection quantity of the relevant cylinder, the current injected fuel quantity can be classified as too low or too high to check the relevant cylinder with respect to the cylinder-specific engine speed, if the difference is greater than a predetermined threshold value. According to a further embodiment, to determine the difference, a difference between the current value and the stored reference value of the cylinder-specific injection quantity of the relevant cylinder can be determined, the current injected fuel quantity can be classified as too low or too high depending on a sign and an amount of the difference. According to a further embodiment, to check the uneven running of the internal combustion engine, a cylinder-specific engine speed of the cylinders relative to a position of the crankshaft can be determined, a check can be carried out to determine whether the cylinder-specific engine speeds of all cylinders each lie within the predetermined speed range, the fault-free operation of the internal combustion engine with respect to uneven running can be detected if all cylinder-specific engine speeds lie within the predetermined speed range. According to a further embodiment, the uneven running of the internal combustion engine can be checked only when the internal combustion engine is being operated at idling speed, if no driver input is present, no gear is engaged and/or no additional consumer of the internal combustion engine is active.

According to yet another embodiment, a device for operating an internal combustion engine which comprises at least two cylinders, an induction tract and an exhaust-gas tract, which communicate with a combustion chamber of one of the cylinders depending on a switched position of a gas inlet valve and/or of a gas exhaust valve, and which comprises at least one injection valve and one piston for each of the cylinders, with said piston being connected to a crankshaft of the internal combustion engine, may be operable—to check whether one or more necessary diagnostic conditions for a diagnosis of an uneven running of the internal combustion engine are currently present,—to check whether the internal combustion engine is functioning fault-free with respect to uneven running, if one and/or more of the necessary diagnostic conditions are currently present,—if the internal combustion engine is functioning fault-free with respect to uneven running,—to determine a current value of a cylinder-specific injection quantity for each cylinder depending on a control input to the injection valve,—to assign the current value of the cylinder-specific injection quantity to a reference value of the cylinder-specific injection quantity at a current operating point of the internal combustion engine,—to store the reference value of the cylinder-specific injection quantity.

According to yet another embodiment, a device for operating an internal combustion engine, which comprises at least two cylinders, an induction tract and an exhaust-gas tract, which communicate with a combustion chamber of one of the cylinders depending on a switched position of a gas inlet valve and/or of a gas exhaust valve, and which has at least one injection valve and one piston for each of the cylinders, with said piston being connected to a crankshaft of the internal combustion engine, may be operable—to check whether one or more necessary diagnostic conditions for a diagnosis of an uneven running of the internal combustion engine are currently present,—to check whether the internal combustion engine is functioning fault-free with respect to the uneven running, if one or more necessary diagnostic conditions are currently present,—if the internal combustion engine is not functioning fault-free with respect to uneven running,—to determine a current value of a cylinder-specific fuel quantity of the cylinders,—to check whether a current injected cylinder-specific fuel quantity of one of the cylinders is too low or too high to check the relevant cylinder with respect to the cylinder-specific engine speeds, in that the current value of the cylinder-specific injection quantity of the relevant cylinder is compared with a stored reference value of the cylinder-specific injection quantity of the relevant cylinder at the current operating point of the internal combustion engine,—to deactivate a check with respect to the cylinder-specific engine speeds of one of the cylinders if the current injected cylinder-specific fuel quantity of the relevant cylinder is too low or too high to check the relevant cylinder with respect to the cylinder-specific engine speeds,—to check whether the cylinder-specific engine speeds lie within the predetermined speed range, to check the cylinders with respect to the cylinder-specific engine speeds,—to detect a faulty operation of one of the cylinders if the relevant cylinder-specific engine speed of the relevant cylinder lies outside the predetermined speed range.

BRIEF DESCRIPTION OF THE DRAWINGS

The invention is explained in more detail in the following with the aid of schematic drawings.

The drawings are as follows.

Elements of the same construction or with the same function are identified by the same reference characters in the various illustrations.

DETAILED DESCRIPTION

Figure 1:
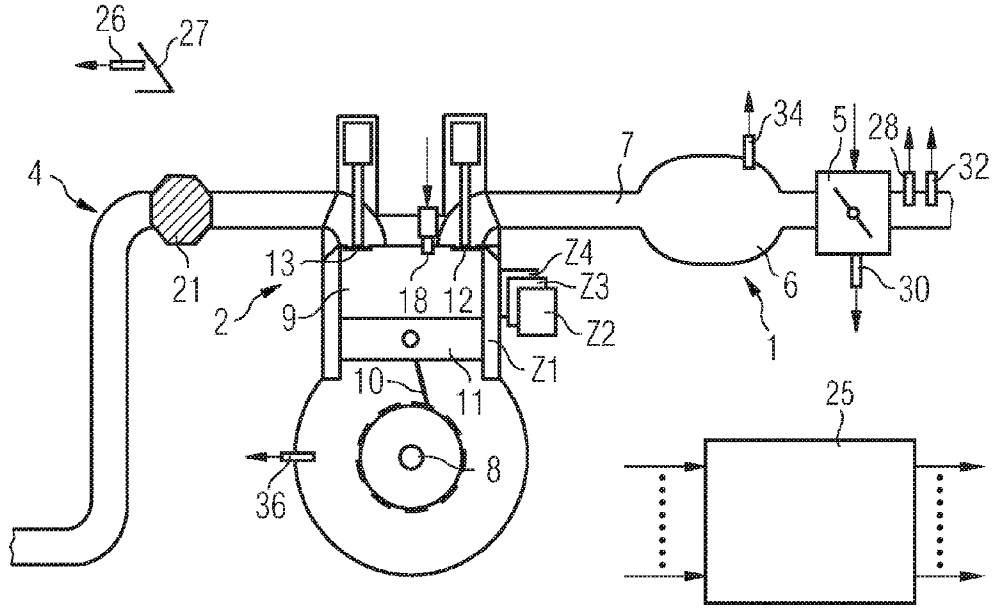
FIG. 1 An internal combustion engine.

With regard to a first aspect, in a method and device for operating an internal combustion engine, wherein the internal combustion engine comprises at least two cylinders, an induction tract and an exhaust-gas tract, the induction tract and the exhaust-gas tract communicate with a combustion chamber of one of the cylinders relative to a switched position of a gas inlet valve or a gas exhaust valve. Furthermore, the internal combustion engine has, for each of the cylinders, at least one injection valve and a piston, with the piston being connected to a crankshaft of the internal combustion engine. For operation of the internal combustion engine, a check is carried out to determine whether one or more necessary diagnostic conditions for diagnosis of uneven running of the internal combustion engine is currently present. If one or more of the necessary diagnostic conditions is currently present, a check is carried out to determine whether the internal combustion engine is functioning fault-free with respect to the uneven running. If the internal combustion engine is running fault-free with respect to the uneven running, a current value of a cylinder-specific injection quantity relative to a control input to the corresponding injection valve is determined for each cylinder. The current value of the cylinder-specific injection quantity is assigned to a reference value of the cylinder-specific injection quantity at a current operating point of the internal combustion engine. The reference value of the cylinder-specific injection quantity is stored.

The storage of the reference value of the cylinder-specific injection quantity at the operating point can contribute to a very precise performance of the various diagnostic processes and/or analysis processes when operating the internal combustion engine. This contributes to a precise operation of the internal combustion engine.

In an embodiment with respect the first aspect, the current value of the cylinder-specific injection quantity is subjected to low-pass filtering and the low-pass filtered value of the cylinder-specific injection quantity is assigned to the reference value of the cylinder-specific injection quantity. Because of this, short, severe fluctuations in the current value of the cylinder-specific injection quantity are not assigned to the reference value of the cylinder-specific injection quantity. Such short, severe fluctuations can, for example, result from an incorrect calculation of an operating variable of the internal combustion engine and/or from an incorrect detection of a measured value of the internal combustion engine.

With regard to a second aspect, in a method and a device for operating the internal combustion engine, the internal combustion engine comprises at least two cylinders, the induction tract and the exhaust-gas tract. The induction tract and the exhaust-gas tract communicate with the combustion chamber of one of the cylinders depending on the switched setting of the gas inlet valve or gas exhaust valve. Furthermore, the internal combustion engine comprises, for each of the cylinders, at least the injection valve and the piston, with the piston being connected to the crankshaft of the internal combustion engine. For operation of the internal combustion engine, a check is made to determine whether the one or more necessary diagnostic conditions for diagnosis of the uneven running of the internal combustion engine are currently present. If the one or more necessary diagnostic conditions are present, a check is carried out to determine whether the internal combustion engine is functioning fault-free with respect to the uneven running. If the internal combustion engine is not functioning fault-free with respect to the uneven running, the current value of the cylinder-specific fuel quantity is determined. A check is made to determine whether a current injected cylinder-specific fuel quantity in one of the cylinders is too low to check the relevant cylinder with respect to its cylinder-specific engine speed, by comparing the current value of the cylinder-specific injection quantity in the relevant cylinder with the stored reference value of the cylinder-specific injection quantity of the relevant cylinder at the current operating point of the internal combustion engine. The check with respect to the cylinder-specific engine speeds of one of the cylinders is deactivated if the current injected cylinder-specific fuel quantity in the relevant cylinder is too low or too high to check the relevant cylinder with respect to the cylinder-specific engine speed. The relevant cylinder-specific engine speeds should lie within a predetermined speed range. A fault-free operation of one of the cylinders is identified if the corresponding cylinder-specific engine speed of the relevant cylinder lies outside the predetermined speed range.

This helps to classify as faulty only the operation of that cylinder whose cylinder-specific engine speed is too low or too high on the basis of an actual fault, for example on the basis of a misfire in the relevant cylinder. Due to a control of the internal combustion engine with respect to the uneven running, the cylinder-specific engine speed can deviate strongly from a predetermined cylinder-specific engine speed even though the relevant cylinder is functioning fault-free, for example in order to compensate for the uneven running of a different misfiring cylinder.

In an embodiment according to the second aspect, a difference between the current value and the stored reference value of the cylinder-specific injection quantity of the relevant cylinder is determined in order to compare the current value of the cylinder-specific injection quantity of the relevant cylinder with the stored reference value of the cylinder-specific injection quantity of the relevant cylinder at the current operating point of the internal combustion engine. The current injected fuel quantity is classified as too low or too high to check the relevant cylinder with respect to the cylinder-specific engine speed if the difference is greater than a predetermined threshold value. This helps to identify which cylinder is operating fault-free simply and very precisely.

In a further embodiment according to the second aspect, a difference between the current value and the stored reference value of the cylinder-specific injection quantity of the relevant cylinder is formed in order to determine the difference between the current value and the stored reference value of the cylinder-specific injection quantity of the relevant cylinder. The current injected fuel quantity is then classified as too large or too small depending on a sign and an amount of the difference.

In a further embodiment according to the first and/or second aspect, the cylinder-specific engine speeds of the cylinders relative to a position of the crankshaft are determined to check the uneven running of the internal combustion engine. A check is carried out to determine whether the cylinder-specific engine speeds of all cylinders each lie within a predetermined speed range. A fault free operation of the internal combustion engine is identified if all the cylinder-specific engine speeds lie within the predetermined speed range. This contributes to a precise classification of the fault-free operation of the internal combustion engine.

In a further embodiment according to the first and/or second aspect, the uneven running of the internal combustion engine is checked only when the internal combustion engine is idling, when no driver input is present, when no gear is engaged and/or if no additional consumer of the internal combustion engine is active. This enables the operation of the internal combustion engine to be particularly precisely checked.

The various embodiments of the methods can be easily transferred to embodiments of devices.

It may be preferred if the first and second aspects are realized in a single method or a single device for operation of the internal combustion engine.

An internal combustion engine includes an induction tract 1, an engine block 2, a cylinder head 3 and an exhaust-gas tract 4. The induction tract 1 preferably includes a throttle valve 5, a manifold 6 and an induction pipe 7, which leads to a first cylinder Z1 via an induction port in a combustion chamber 9 of the engine block 2. The engine block 2 includes a crankshaft 8, which is connected by a connecting rod 10 to the piston 11 of the first cylinder Z1. In addition to the first cylinder Z1, the internal combustion engine includes at least one second cylinder Z2 and preferably also further cylinders Z1-Z4. The internal combustion engine can, however, also include any larger number of cylinders Z1-Z4. The internal combustion engine is preferably arranged in a motor vehicle.

In the cylinder head 3, an injection valve 18 is preferably arranged. Alternatively, the injection valve 18 can also be arranged in the induction pipe 7. The internal combustion engine can be a diesel internal combustion engine or a petrol internal combustion engine. If the internal combustion engine is a petrol internal combustion engine, it preferably has a spark plug, which is arranged so that it projects into the combustion chamber 9 of the internal combustion engine. In the exhaust-gas tract 4 an exhaust-gas catalytic converter 21 is preferably arranged, which is preferably formed as a three-way catalytic converter.

A control device 25 is provided, to which sensors are assigned which detect various measured variables and determine the measured value of the measured variable in each case. The control device 25 determines, depending on at least one of the measured variables, operating variables that are used to operate the internal combustion engine and/or correcting variables, which are then converted into one or more correcting signals for control of the correcting elements by means of the corresponding servodrives. The control device 25 can also be described as a device for controlling the internal combustion engine.

The sensors are, for example, a pedal position indicator 26 which detects the position of a gas pedal 27, an air mass sensor 28 which detects an air mass flow upstream of the throttle valve 5, a throttle valve position sensor 30 which detects the degree of opening of the throttle valve 5, a temperature sensor 32 which detects an induction air temperature, an induction pipe pressure sensor 34 which detects the induction pipe pressure in the manifold 6 and/or a crankshaft angle sensor 36 which detects a crankshaft angle, to which a speed of the internal combustion engine is then assigned.

Depending on the embodiment, any subset of the named sensors can be present or additional sensors can also be present.

The correcting elements are, for example, the throttle valve 5, the gas inlet and gas exhaust valves 12, 13 and/or the injection valve 18.

Figure 2:
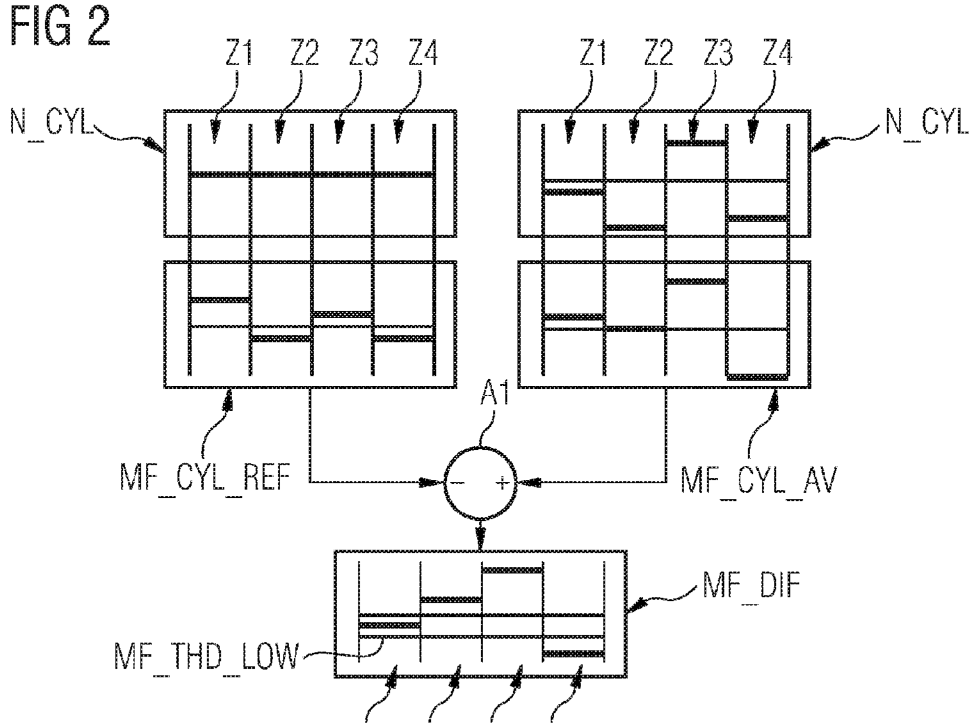
FIG. 2 Cylinder-specific engine speeds and cylinder-specific injection quantities, FIG. 3 A flow diagram of a first program for operating the internal combustion engine, FIG. 4 A flow diagram of a second program for operating the internal combustion engine, FIG. 5 A flow diagram of a third program for operating the internal combustion engine.
Figure 5:
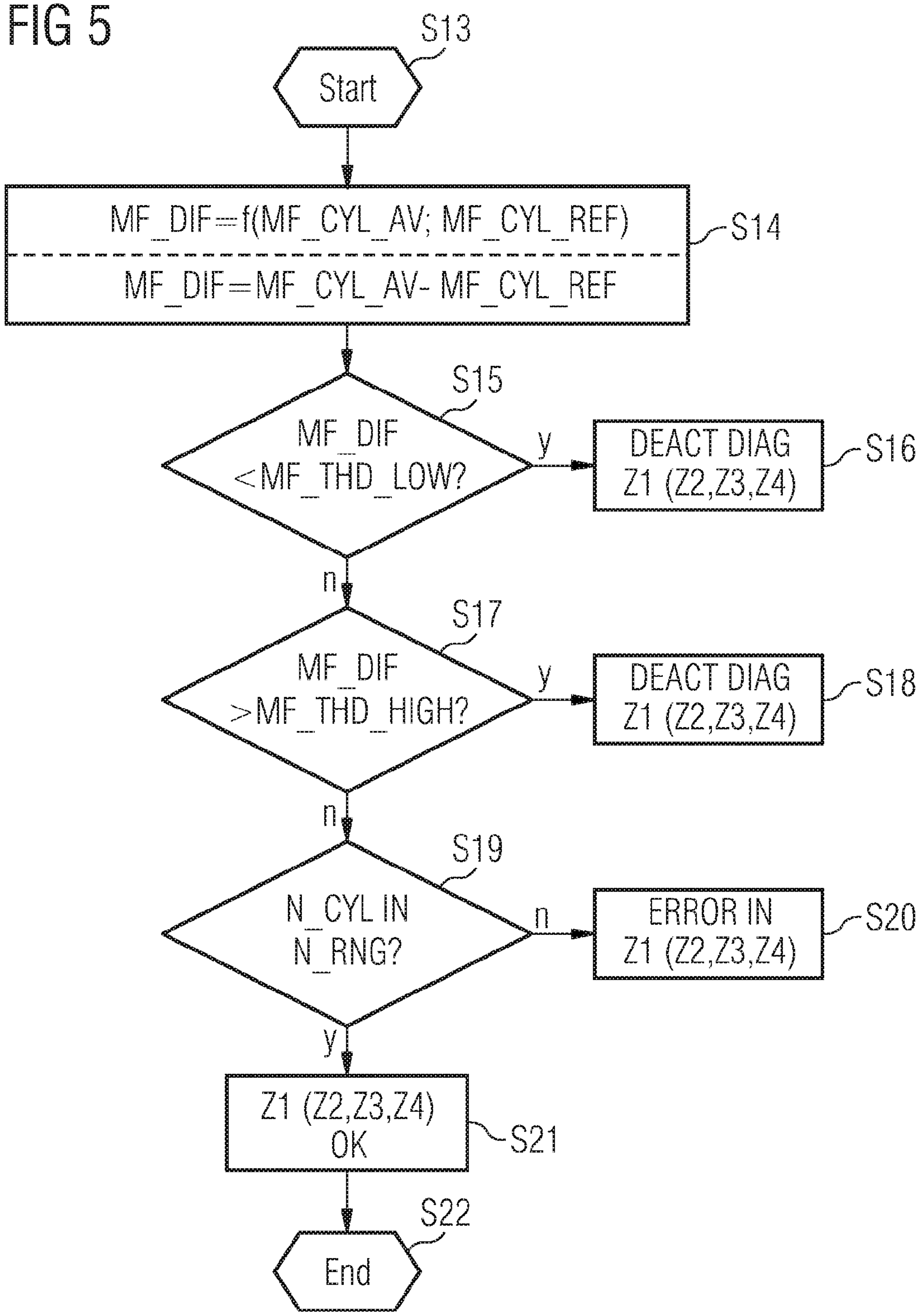

An uneven running ER of the internal combustion engine can be classified as sufficiently negligible, for example, if the cylinder-specific engine speeds N_CYL of the individual cylinders Z1-Z4 all lie within a predetermined speed range N_RNG (FIG. 2, FIG. 5). The specification of the speed range N_RNG in this connection can mean that the speed range N_RNG is absolutely predetermined or that the speed range N_RNG is specified relative to one of the cylinder-specific engine speeds N_CYL. For example, a check can be carried out to determine whether the cylinder-specific engine speeds N_CYL lie within the relative specified speed range N_RNG, in that a check is carried out to establish whether a change in the cylinder-specific engine speed N_CYL from one cylinder Z1-Z4 to the next cylinder Z1-Z4 is less than a specified change threshold value.

The cylinder-specific engine speed N_CYL of one of the cylinders Z1-Z4 can, for example, be determined by measuring the time which the crankshaft 8 requires to pass over the corresponding cylinder segment of the crankshaft 8. The cylinder segment of the crankshaft 8 in this connection is preferably an angular range of the crankshaft 8 between the top dead center of a predetermined cylinder Z1-Z4 and the top dead center of the following cylinder Z1-Z4. Alternatively, the uneven running ER can be determined in that, for example, in a mathematical development of the total engine speed of the internal combustion engine the higher powers, e.g. from the third power, of the mathematical development are considered.

Because, due to the system, the cylinders Z1-Z4 can react slightly differently from each other in response to the same input control signals, it can be that the cylinders Z1-Z4 are differently controlled to avoid excessive uneven running ER. In particular, different cylinder-specific injection quantities are injected into the cylinders Z1-Z4 for this purpose. With the fault-free operation of the internal combustion engine relative to the uneven running ER, a reference value MF_CYL_REF of the cylinder-specific injection quantity can therefore vary from cylinder Z1-Z4 to cylinder Z1-Z4, in order to bring cylinder-specific engine speeds N_CYL within the predetermined speed range N_RNG.

If the uneven running ER is too great, this, for example, causes at least one of the cylinder-specific engine speeds N_CYL to consequently lie outside the predetermined speed range N_RNG and thus differ considerably from the other cylinder-specific engine speeds N_CYL. In a case, shown in FIG. 2, where the cylinder-specific engine speeds N_CYL vary considerably from each other, the second cylinder Z2 or a fourth cylinder Z4 of the internal combustion engine can, for example, have caused a misfire, because the combustion process has not occurred in the relevant cylinder Z1-Z4 or has not delivered sufficient energy, so that the relevant cylinder Z1-Z4 does not have a sufficiently high cylinder-specific engine speed N_CYL. With one example (not illustrated), the excessive uneven running ER can also be caused by the combustion process in one of the cylinders Z1-Z4 having delivered too much energy, for example, due to an excessive quantity of injected fuel. This leads to a cylinder-specific engine speed N_CYL which is too high and then also lies outside the predetermined speed range N_RNG and thus deviates considerably from the other cylinder-specific engine speeds N_CYL.

Due to control of the internal combustion engine relative to the uneven running ER, it can, however, be that only the second or fourth cylinder Z2, Z4 has caused the misfire and the relevant other cylinders Z1-Z4 have been deliberately controlled so that the misfire of the relevant cylinder Z1-Z4 has been compensated for with respect to the uneven running ER. With the example (not illustrated), it can be that due to the control of the internal combustion engine with respect to the uneven running ER, the combustion process has been deliberately controlled by the injection of a fuel quantity which is too high. Therefore, it can be that the current quantity of fuel injected into one of the cylinders Z1-Z4 is deliberately so low or so high that a check CHECK of the relevant cylinder Z1-Z4 with regard to the cylinder-specific engine speed N_CYL serves no purpose. Therefore it is preferable to determine a current value MF_CYL_AV of the cylinder-specific injection quantity for the operation of the internal combustion engine with respect to the uneven running ER.

To check whether one of the cylinders Z1-Z4 has been controlled in such a way that the check CHECK of the relevant cylinder is not meaningful with respect to the cylinder-specific engine speed N_CYL, particularly because the cylinder-specific injection quantity is too low or too high, the current value MF_CYL_AV of the cylinder-specific injection quantity is preferably compared with the reference value MF_CYL_REF of the cylinder-specific injection quantity at the same operating point of the internal combustion engine. For example, a difference between the current value MF_CYL_AV of the cylinder-specific injection quantity and the reference value MF_CYL_REF of the cylinder-specific injection quantity can be found. If the difference is greater than a predetermined threshold value, the relevant cylinder Z1-Z4 can be excluded from the check with respect to the uneven running ER, especially with respect to the relevant cylinder-specific engine speed N_CYL. In particular, the check of the relevant cylinder Z1-Z4 with respect to the cylinder-specific engine speed N_CYL can be deactivated DEACT.

The difference can, for example, be determined by forming a difference MF_DIF between the current value MF_CYL_AV of the cylinder-specific injection quantity and the reference value MF_CYL_REF of the cylinder-specific injection quantity. The injected fuel quantity can then be classified as too low or too high if an amount of the difference MF_DIF is greater than the predetermined threshold value. For example, the reference value MF_CYL_REF of the cylinder-specific injection quantity can be subtracted from the current value MF_CYL_AV of the cylinder-specific injection quantity. In this connection, the injected fuel quantity can be classified as too low if the difference MF_DIF is less than a given lower threshold value MF_THD_LOW and the injected fuel quantity can be classified as too high if the difference MF_DIF is greater than a predetermined upper threshold value MF_THD_HIGH (FIG. 5).

Alternatively, the difference between the current value MF_CYL_AV and the reference value MF_CYL_REF of the cylinder-specific injection quantity can be determined by forming a quotient from the current value MF_CYL_AV and the reference value MF_CYL_REF of the cylinder-specific injection quantity, with it then being possible to determine whether the cylinder-specific injection quantity is too high or too low, for example by a comparison with the value 1.

Figure 3:
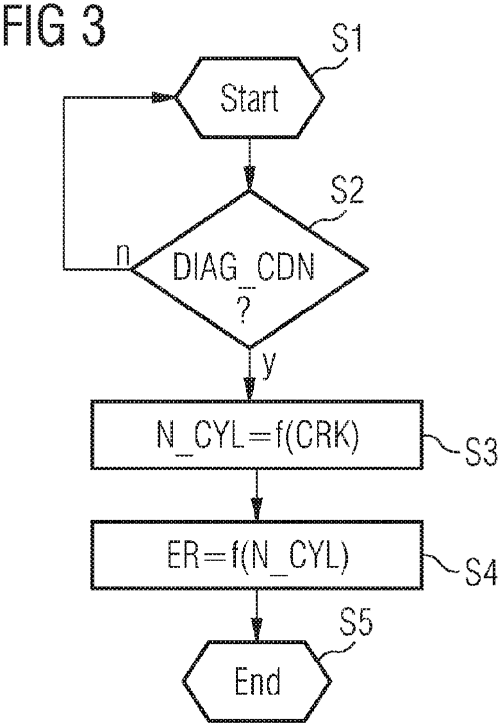

A first program (FIG. 3) is preferably stored on a storage medium of the control device 25. The purpose of the first program is to check the uneven running ER of the internal combustion engine. The first program, in which variables may be initialized, is started in step S1, preferably as soon as possible after the start of the engine of the internal combustion engine.

In a step S2, a check is carried out to determine whether one or more diagnostic conditions DIAG_CDN is/are present. The diagnostic conditions DIAG_CDN can, for example, be operation of the internal combustion engine in idling, the absence of a driver input, no gear engaged and/or no further active vehicle functions switched on that require additional torque from the internal combustion engine. If the condition of step S2 is not met, the process is started again in step S1. If the condition of step S2 is met, the process is preferably continued in a step S3. In step S3, the cylinder-specific engine speed N_CYL of the cylinders Z1-Z4 is determined relative to a crankshaft angle of the internal combustion engine.

In a step S4, the uneven running ER is determined relative to the cylinder-specific engine speed N_CYL.

The first program can be ended in a step S5. Preferably, a second or third program is started at the ending of the first program, depending on the result of the check for uneven running ER.

Figure 4:
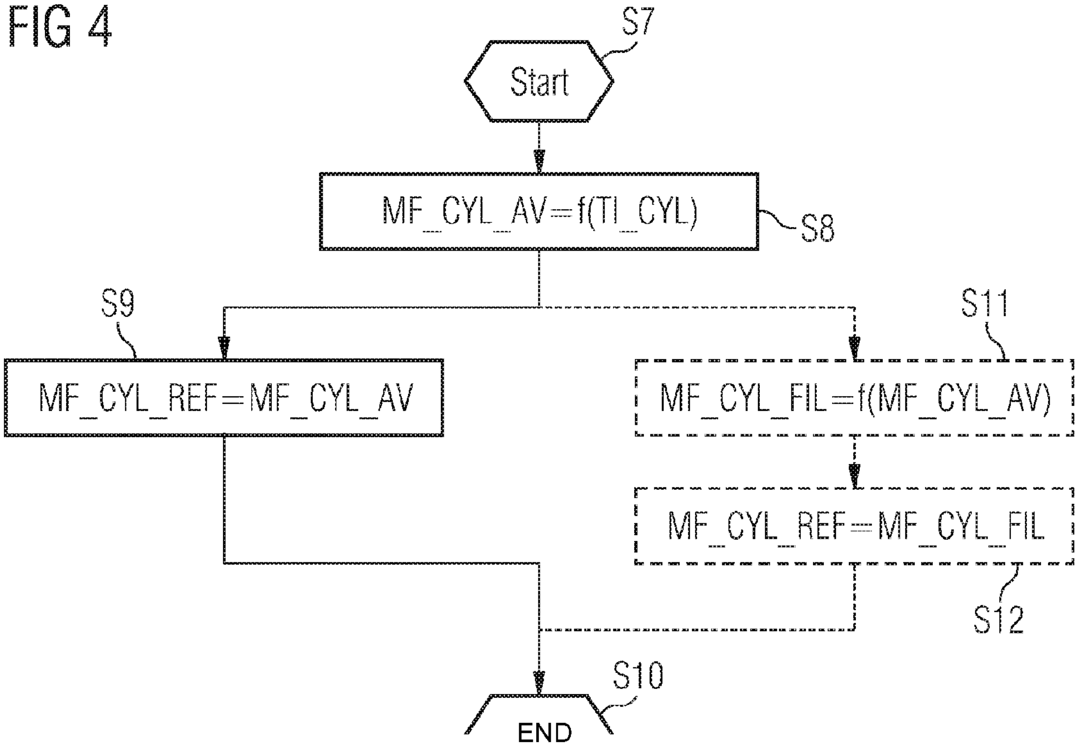

The second program (FIG. 4) is preferably stored on the storage medium of the control device 25 and serves to determine and save the reference value MF_CYL_REF of the cylinder-specific injection quantities. The second program is preferably started in step S7 after the ending of the first program, in which variables are also initialized as required.

In a step S8, the current value MF_CYL_AV of the cylinder-specific injection quantity is determined relative to a cylinder-specific injection duration TI_CYL. During the cylinder-specific injection duration TI_CYL, the injection valve 18 is controlled to inject the fuel quantity or during the cylinder-specific injection duration TI_CYL the injection valve 18 actually meters the current cylinder-specific fuel quantity to the relevant cylinder Z1-Z4. Alternatively, the current value MF_CYL_AV of the cylinder-specific injection quantity can also be determined relative to the cylinder-specific engine speed N_CYL. Furthermore, based on the cylinder-specific engine speed N_CYL, a recalculation can be carried out to determine what cylinder-specific injection quantity was necessary in order to produce the cylinder-specific engine speed N_CYL.

In step S9, the reference value MF_CYL_REF of the cylinder-specific cylinder injection quantity at the current operating point of the internal combustion engine can be assigned the current value MF_CYL_AV of the cylinder-specific injection quantity. The reference value MF_CYL_REF of the cylinder-specific injection quantity is preferably stored on the storage medium of the control device 25. The operating point of the internal combustion engine depends on at least one of the operating variables of the internal combustion engine.

As an alternative to step S9, steps S11 and S12 are processed. In step S11, a low-pass filtered current value MF_CYL_FIL of the cylinder-specific injection quantity is determined, in that the current value MF_CYL_AV of the cylinder-specific injection quantity is low-pass filtered.

In step S12, the reference value MF_CYL_REF of the cylinder-specific injection quantity at the relevant operating point of the internal combustion engine is assigned the current low-pass filtered value MF_CYL_FIL of the cylinder-specific injection quantity. The assignment of the low-pass filtered current value MF_CYL_FIL of the cylinder-specific injection quantity to the reference value MF_CYL_REF of the cylinder-specific injection quantity serves to ensure that abrupt changes in the current value MF_CYL_AV of the cylinder-specific injection quantity, which cannot arise from the actual processes in the internal combustion engine, are not assigned to the reference value MF_CYL_REF of the cylinder-specific injection quantity at the relevant operating point of the internal combustion engine.

In a step S10, the second program can be ended. Preferably, the first program is started as the second program ends.

The third program (FIG. 5) is preferably stored on the storage medium of the control device 25. The third program serves to determine the faulty cylinder Z1-Z4, which, for example, has caused the misfire. The third program is preferably started as the first program ends.

In a step S14, the reference value MF_CYL_REF of the cylinder-specific injection quantity at the current operating point of the internal combustion engine and the current value MF_CYL_AV of the cylinder-specific injection quantity are compared, preferably by determining the difference MF_DIF between the current value MF_CYL_AV of the cylinder-specific injection quantity and the reference value MF_CYL_REF of the cylinder-specific injection quantity, preferably using the calculation rule given in S14.

In a step S15, a check is carried out to determine whether the difference MF_DIF is less than the predetermined lower threshold value MF_THD_LOW. If the condition of step S15 is not met, the process is continued in a step S16. If the condition of step S15 is met, the process is continued in step S17.

In step S16, the check CHECK of the relevant cylinder Z1-Z4 with respect to the cylinder-specific engine speed N_CYL is deactivated DEACT. Furthermore, in step S16 a signal can be generated that indicates the injected fuel quantity is too low.

In step S17, a check is carried out the determine whether the difference MF_DIF is greater than the predetermined upper threshold value MF_THD_HIGH. If the condition of step S17 is not met, the process is continued in step S19. If the condition of step S17 is met, the process is continued in step S18.

In step S18, the check CHECK of the relevant cylinder Z1-Z4 with respect to the cylinder-specific engine speed N_CYL is deactivated DEACT. Furthermore, in step S16 a signal can be generated that indicates that the injected fuel quantity is too high.

In step S19, a check CHECK is carried out to determine whether the cylinder-specific engine speed N_CYL of the relevant cylinder Z1-Z4 lies within the predetermined speed range N_RNG. If the condition of step S19 is not met, the process is continued in step S20. If the condition of step S19 is met, the process is continued in step S21.

In step S20, a fault ERROR is detected in the relevant cylinder Z1-Z4 with respect to the uneven running ER of the internal combustion engine. In this case, this means that the relevant cylinder Z1-Z4 has, for example, caused the misfiring.

In step S21 the fault-free operation of the cylinder Z1-Z4 with respect to uneven running ER of the internal combustion engine is detected.

In step S22, the third program is preferably ended. The first program is preferably started as the third program ends.

The invention is not limited to the given examples of the embodiments. For example, the first and/or second and/or third programs can be implemented together in one program. Furthermore, the fault-free operation of the internal combustion engine with respect to uneven running ER can be determined in an alternative manner, for example by checking the torque produced by the internal combustion engine. Furthermore, the reference value MF_CYL_REF of the cylinder-specific injection quantity can be used to check the plausibility of, and/or to determine one or more further, operating variables of the internal combustion engine. Furthermore, to determine the difference MF_DIF, the current value MF_CYL_AV of the cylinder-specific injection quantity can also be subtracted from the reference value MF_CYL_REF of the cylinder-specific injection quantity, in which case the sign of the difference MF_DIF must be appropriately differently interpreted. Furthermore, it is to be noted that the first aspect and the second aspect and the associated embodiments can be combined with each other.

What is claimed is:

1. A method for operating an internal combustion engine, which comprises as least two cylinders, an induction tract and an exhaust-gas tract, which communicate with a combustion chamber of one of the cylinders depending on a switched position of at least one of a gas inlet valve and a gas exhaust valve, and which, for each of the cylinders, comprises at least one injection valve and a piston, with said piston being connected to a crankshaft of the internal combustion engine, the method comprising the steps of:

determining whether one or more necessary diagnostic conditions for a diagnosis of uneven running of the internal combustion engine are currently present, if at least one of the necessary diagnostic conditions are currently present, determining whether the internal combustion engine is functioning fault-free with respect to uneven running by:

determining a cylinder-specific engine weed of each of the cylinders relative to a position of the crankshaft, determining whether the cylinder-specific engine speed of each cylinder lies within a corresponding predetermined speed range, and determining that the internal combustion engine is functioning fault-free with respect to uneven running if it is determined that all cylinder-specific engine speeds lie within the corresponding predetermined speed range, if it is determined that the internal combustion engine is functioning fault-free with respect to uneven running:

determining a current value of a cylinder-specific injection quantity for each cylinder depending on a control input to the relevant injection valve, assigning the current value of the cylinder-specific injection quantity to a reference value of the cylinder-specific injection quantity at a current operating point of the internal combustion engine, and storing the reference value of the cylinder-specific injection quantity.

2. The method according to claim 1, wherein the current value of the cylinder-specific injection quantity being low-pass filtered and the low-pass filtered value of the cylinder-specific injection quantity being assigned to the reference value of the cylinder-specific injection value.

3. The method according to claim 1, wherein the uneven running of the internal combustion engine is checked only when the internal combustion engine is being operated at idling speed, if no driver input is present, at least one of no gear is engaged and no additional consumer of the internal combustion engine is active.

4. The method according to claim 1, wherein determining whether the cylinder-specific engine speed of each cylinder lies within a corresponding predetermined speed range comprises comparing the cylinder-specific engine speed of each cylinder to the same predetermined speed range.

5. The method according to claim 1, wherein determining whether the cylinder-specific engine speed of each cylinder lies within a corresponding predetermined speed range comprises comparing the cylinder-specific engine speed of each cylinder to a predetermined speed range specific to that cylinder.

6. A device for operating an internal combustion engine which comprises at least two cylinders, an induction tract and an exhaust-gas tract, which communicate with a combustion chamber of one of the cylinders depending on a switched position of at least one of a gas inlet valve and a gas exhaust valve, and which comprises at least one injection valve and one piston for each of the cylinders, with said piston being connected to a crankshaft of the internal combustion engine, with the device being operable to check whether one or more necessary diagnostic conditions for a diagnosis of an uneven running of the internal combustion engine are currently present, if at least one of the necessary diagnostic conditions are currently present, to check whether the internal combustion engine is functioning fault-free with respect to uneven running by:

determining a cylinder-specific engine speed of each of the cylinders relative to a position of the crankshaft, determining whether the cylinder-specific engine speed of each cylinder lies within a corresponding predetermined speed range, and, determining that the internal combustion engine is functioning fault-free with respect to uneven running if it is determined that all cylinder-specific engine speeds lie within the corresponding predetermined speed range, if it is determined that the internal combustion engine is functioning fault-free with respect to uneven running:

to determine a current value of a cylinder-specific injection quantity for each cylinder depending on a control input to the injection valve, to assign the current value of the cylinder-specific injection quantity to a reference value of the cylinder-specific injection quantity at a current operating point of the internal combustion engine, and to store the reference value of the cylinder-specific injection quantity.

* * * * *